(12) United States Patent
Segovia et al.

(10) Patent No.: US 9,033,109 B2
(45) Date of Patent: May 19, 2015

(54) SYSTEM AND METHOD FOR LUBRICATING GEARS IN A WIND TURBINE

(75) Inventors: Eugenio Yegro Segovia, Madrid (ES); Jacob Johannes Nies, Zwolle (NL); Pedro Luis Benito Santiago, Mostoles (ES); Alvaro Jaime Calle Garrido, Madrid (ES); Miguel Bartolome Lopez, Madrid (ES)

(73) Assignee: General Electric Company, Schenectady, NY (US)

( * ) Notice: Subject to any disclaimer, the term of this patent is extended or adjusted under 35 U.S.C. 154(b) by 586 days.

(21) Appl. No.: 13/362,293

(22) Filed: Jan. 31, 2012

(65) Prior Publication Data

US 2013/0192930 A1     Aug. 1, 2013

(51) Int. Cl.
   *F16H 57/04*     (2010.01)
   *F03D 11/00*     (2006.01)

(52) U.S. Cl.
   CPC ........ *F03D 11/0008* (2013.01); *F16H 57/0431* (2013.01); *F16H 57/0456* (2013.01); *F16H 57/0464* (2013.01); *Y02E 10/722* (2013.01)

(58) Field of Classification Search
   CPC ............ F16H 57/04; F16N 7/12; F03D 11/00
   USPC .............................. 184/14, 6.12, 6.11; 74/468
   See application file for complete search history.

(56) References Cited

U.S. PATENT DOCUMENTS

| | | | | |
|---|---|---|---|---|
| 3,424,022 A | * | 1/1969 | Greenberg et al. | 74/409 |
| 3,822,607 A | * | 7/1974 | Tharaldsen | 74/468 |
| 5,251,725 A | * | 10/1993 | Barrett, Jr. | 184/6.14 |
| 5,622,239 A | * | 4/1997 | Orlitzky | 184/6.12 |
| 7,244,097 B2 | * | 7/2007 | Hinz et al. | 415/122.1 |
| 7,699,584 B2 | | 4/2010 | Mollhagen | |
| 8,047,332 B2 | * | 11/2011 | Salmela et al. | 184/6.12 |
| 8,196,489 B2 | * | 6/2012 | Paluncic et al. | 74/468 |
| 2008/0276743 A1 | * | 11/2008 | Salmela et al. | 74/467 |
| 2009/0220343 A1 | | 9/2009 | Dimascio et al. | |
| 2010/0007151 A1 | | 1/2010 | Ciszak et al. | |

FOREIGN PATENT DOCUMENTS

| DE | 101 29 089 A1 | 4/2003 |
|---|---|---|
| DE | 101 29 089 B4 | 8/2006 |

* cited by examiner

*Primary Examiner* — William E Dondero
*Assistant Examiner* — Mark K Buse
(74) *Attorney, Agent, or Firm* — Dority & Manning, P.A.

(57) ABSTRACT

A system and method for lubricating gears in a wind turbine blade pitch drive are provided, wherein the pitch drive comprises a drive pinion gear with gear teeth that engage a pitch bearing gear coupled to a respective wind turbine blade. A grease distributor is configured to mount onto and rotate with the pinion gear, and is configured to deliver grease from an external grease supply to at least one valley defined between adjacent teeth of the pinion gear in a contact area of the pinion gear with the bearing gear without the distributor contacting inter-engaging teeth of the bearing gear.

16 Claims, 7 Drawing Sheets

SYSTEM AND METHOD FOR LUBRICATING GEARS IN A WIND TURBINE

FIELD OF THE INVENTION

The present subject matter relates generally to wind turbines and, more particularly, to a system lubricating gears in the wind turbine, especially turbine blade pitch gears.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

Proper lubrication of the various open gears in wind turbines has proven to be an important consideration in the operation and maintenance of the systems. This is especially true for the pitch control gears associated with each of the turbine blades. These gears operate in a relatively small defined positional range during the majority of the wind turbine's operating life wherein the pitch of the rotor blades is maintained relatively constant at the maximum design power operation of the wind turbine. At this position, the pitch of the blades is generally maintained between 0° and 3° (known as the 0° position) with or without automatic load control. The engaged pitch drive gears in this localized area are subjected to relatively high loads induced in large part by the torsional forces acting on the blades. The remaining gear teeth are only infrequently loaded, for example when the blades are feathered from the 0° position for power reduction or load control.

The grease that is applied to the gear teeth in the 0° position of the pitch drives is displaced from the contact areas long before the remaining circumferential sectors of the gears. Frictional corrosion can occur in this area without frequent and regular lubrication. Unfortunately, the engaged teeth between the driving pinion gear and the ring gear are difficult to access for greasing as long as the pitch drive remains in an operational position. Typically, the blades must be moved into a "lubricating" position during a maintenance procedure to adequately lubricate the engaged teeth at the 0° position.

Accordingly, a simple and reliable system that allows for adequate lubrication of the 0° pitch drive gears without shutdown of the wind turbine would be useful in the industry.

BRIEF DESCRIPTION OF THE INVENTION

Aspects and advantages of the invention will be set forth in part in the following description, or may be obvious from the description, or may be learned through practice of the invention.

In accordance with aspects of the invention, a system is provided for lubricating gears in a wind turbine blade pitch drive, wherein the pitch drive includes a drive pinion gear with gear teeth that engage a pitch bearing gear coupled to a respective wind turbine blade. In a particular embodiment, the system includes a grease distributor configured to mount onto and rotate with the pinion gear. The distributor is configured to deliver grease from an external grease supply to at least one gear tooth valley defined between adjacent teeth of the pinion gear in a contact area of the pinion gear with the bearing gear without the distributor contacting inter-engaging teeth of the bearing gear.

The distributor may be variously configured. For example, in one embodiment, the distributor includes a central hub configured for receipt of grease from the external grease supply, and at least one channel member in fluid communication with the hub. The channel member has a length and height profile so as to extend longitudinally along the gear tooth valley defined between adjacent teeth of the pinion gear. The channel member has an exit orifice defined therein and grease supplied under pressure to the hub is distributed via the channel member to the tooth valley while the pinion gear remains engaged with the bearing gear.

In a particular embodiment, the grease distributor is variably positionable on the pinion gear such that the channel member is positionable in different tooth valleys of the pinion gear. In this embodiment, the distributor may have less channel members than there are valleys in the pinion gear such that the distributor delivers grease to only a defined sector of the pinion gear. For example, the distributor may include one, two, three, or more channel members. Desirably, the distributor is provided with a sufficient number of channel members to distribute grease into the pinion gear valleys at the 0° position of the pinion gear.

In certain embodiments, the hub is configured for direct receipt of grease from an external grease supply such that grease is forced directly from the hub into the one or more channel members.

In a further embodiment, the distributor includes a plurality of the channel members circumferentially spaced around the hub, with each of the channel members in fluid communication with the hub. For example, a channel member may be provided to reside in each gear valley of the pinion gear. In this particular embodiment, the grease may be distributed simultaneously into all of the channel members directly from the hub. In another embodiment, however, it may be desired to restrict the number of channel members that receive grease. A restrictor device may be disposed within the hub and configured to allow passage of grease to channel members within a defined circumferential sector, and to block passage of grease to the channel members that are not within the defined circumferential sector. The restrictor may be variably positionable relative to the hub so as to change the defined circumferential sector without repositioning the grease distributor on the pinion gear.

In certain embodiments, the channel members may be releasably engaged on the pinion gear for retaining the distributor on the pinion gear. For example, the channel members may be radially biased against the pinion gear, and may include a retaining lip defined on a longitudinal end thereof that engages against an end face of the pinion gear.

The present invention also encompasses various method embodiments for lubricating gears in a wind turbine blade pitch drive, wherein the pitch drive comprises a drive pinion gear with gear teeth that engage a pitch bearing gear coupled to a respective wind turbine blade. The method includes injecting grease into gear tooth valleys defined between adjacent teeth of the pinion gear with a device that resides in the respective valleys during normal power-production operation of the wind turbine.

In certain embodiments, the method includes injecting the grease into only select valleys or sectors of the pinion gear. For example, the select valleys may be at the 0° position of the pinion gear. In other embodiments the grease may be injected into all of the gear tooth valleys of the pinion gear.

Certain of the method embodiments may include selectively moving the greasing device around the pinion gear to lubricate different ones of the gear tooth valleys.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
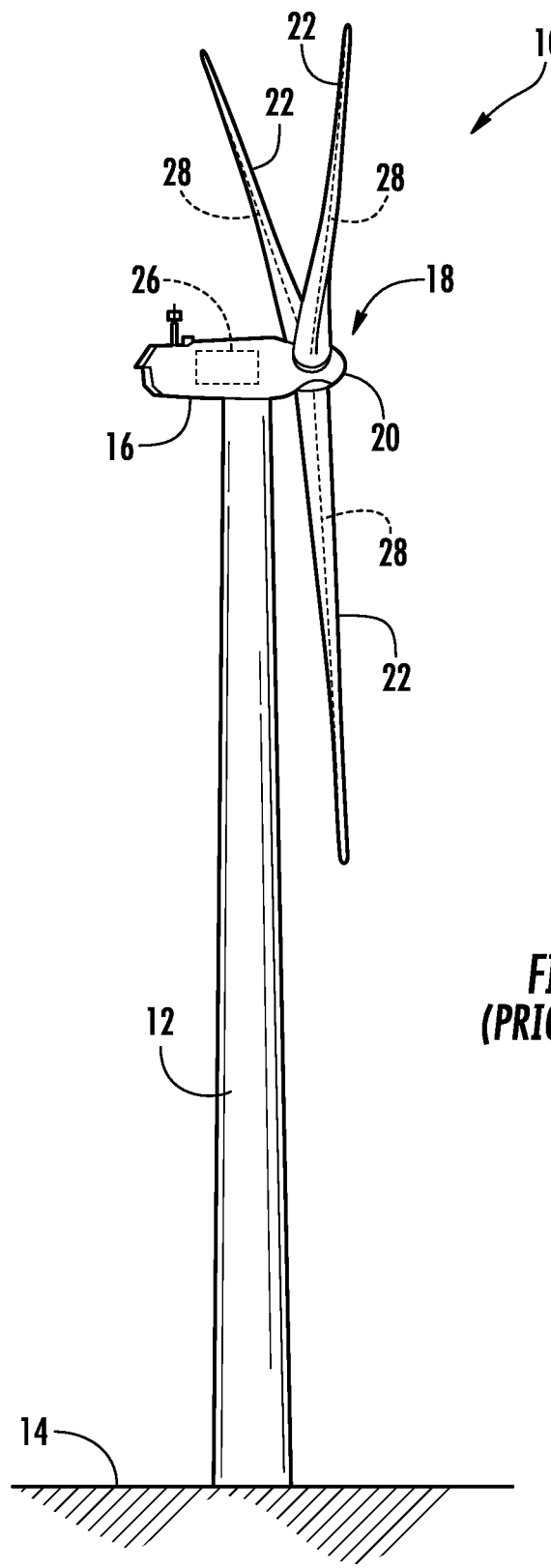
FIG. 1 illustrates a perspective view of one embodiment of a conventional wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of one embodiment of a conventional wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 for production of electrical energy.

The wind turbine 10 may also include a turbine control system or turbine controller 26 centralized within the nacelle 16. In general, the turbine controller 26 may comprise a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch drives 30 (FIG. 2) of the wind turbine 10. During operation of the wind turbine 10, the controller 26 may generally control each pitch drive 30 in order to alter the pitch angle of each rotor blade 22 between 0° (i.e., a power position of the rotor blade 22) and 90° (i.e., a feathered position of the rotor blade 22).

Figure 2:
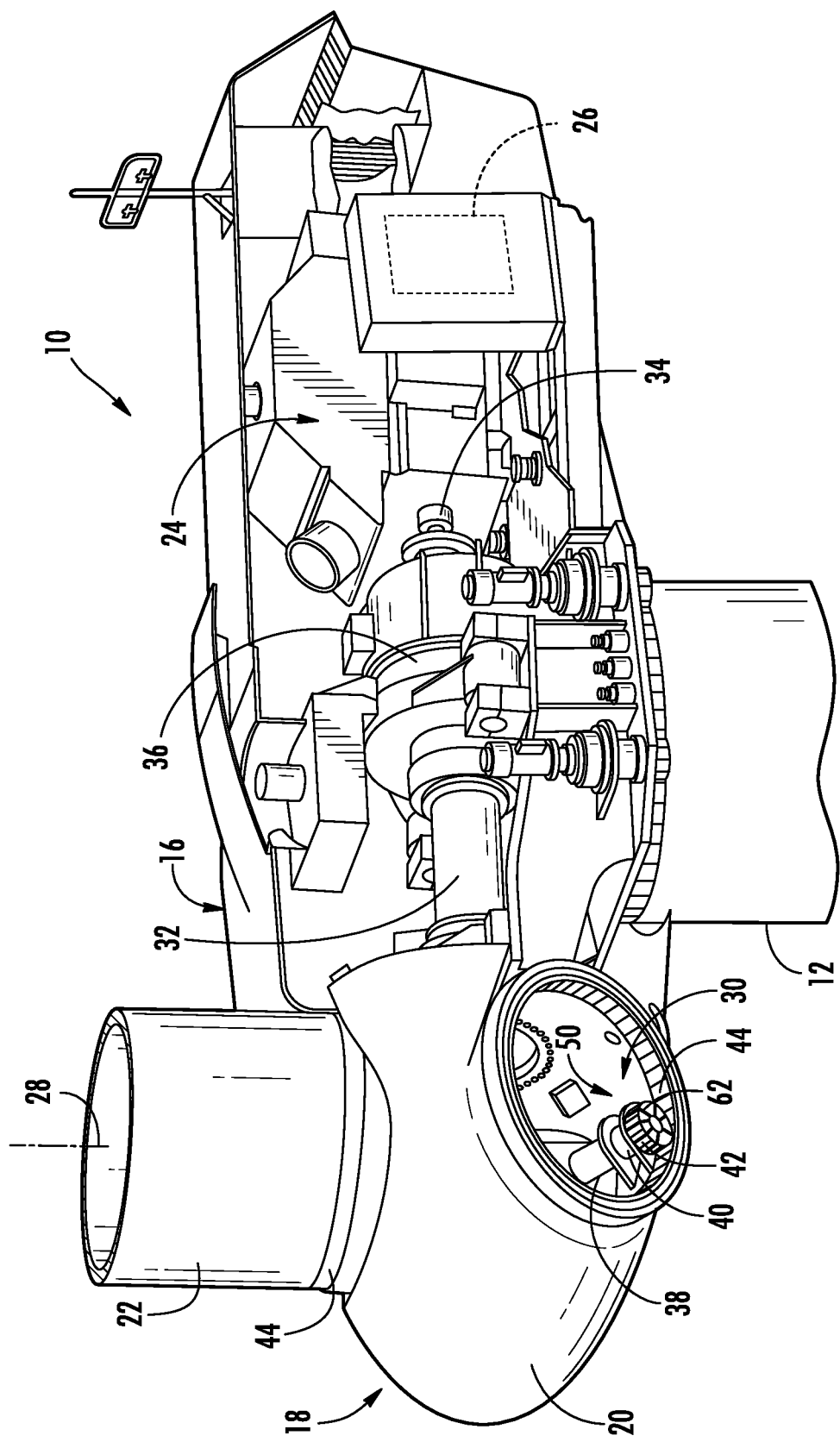
FIG. 2 illustrates a simplified, internal view of one embodiment of a nacelle and rotor hub of a wind turbine.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to each pitch drive 30 of the wind turbine 10 (one of which is shown) to facilitate rotation of each rotor blade 22 about its pitch axis 28.

In general, each pitch drive 30 may include any suitable components and configuration that allows the pitch drive 30 to function as described herein. For example, in several embodiments, each pitch drive 30 may include a pitch drive motor 38 (e.g., any suitable electric motor), a pitch drive gearbox 40, and a pitch drive pinion gear 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion gear 42 for rotation therewith. The pitch drive pinion gear 42 may, in turn, be in rotational engagement with a pitch bearing gear 44 coupled between the hub 20 and a corresponding rotor blade 22 such that rotation of the pitch drive pinion gear 42 causes rotation of the pitch bearing gear 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28.

Still referring to FIG. 2, proper lubrication of the pinion gear 42 and the ring bearing gear 44 of the pitch drive 30 is essential, particularly in the relatively small defined positional range known as the 0° position, as discussed in the "Background" section of this application. In this regard, FIG. 2 illustrates an embodiment of a grease distributor 62 configured on the pinion gear 42. This distributor 62 is configured to be externally coupled to the pinion gear 42 for the purpose of delivering grease directly to the engaged components of the pinion gear 42 and bearing gear 44 without interruption of operation of the pitch drive 30. In other words, the turbine blades 22 do not need to be feathered or rotated to any particular position for application of grease via the grease distributor 62, as discussed in greater detail below.

Figure 3:
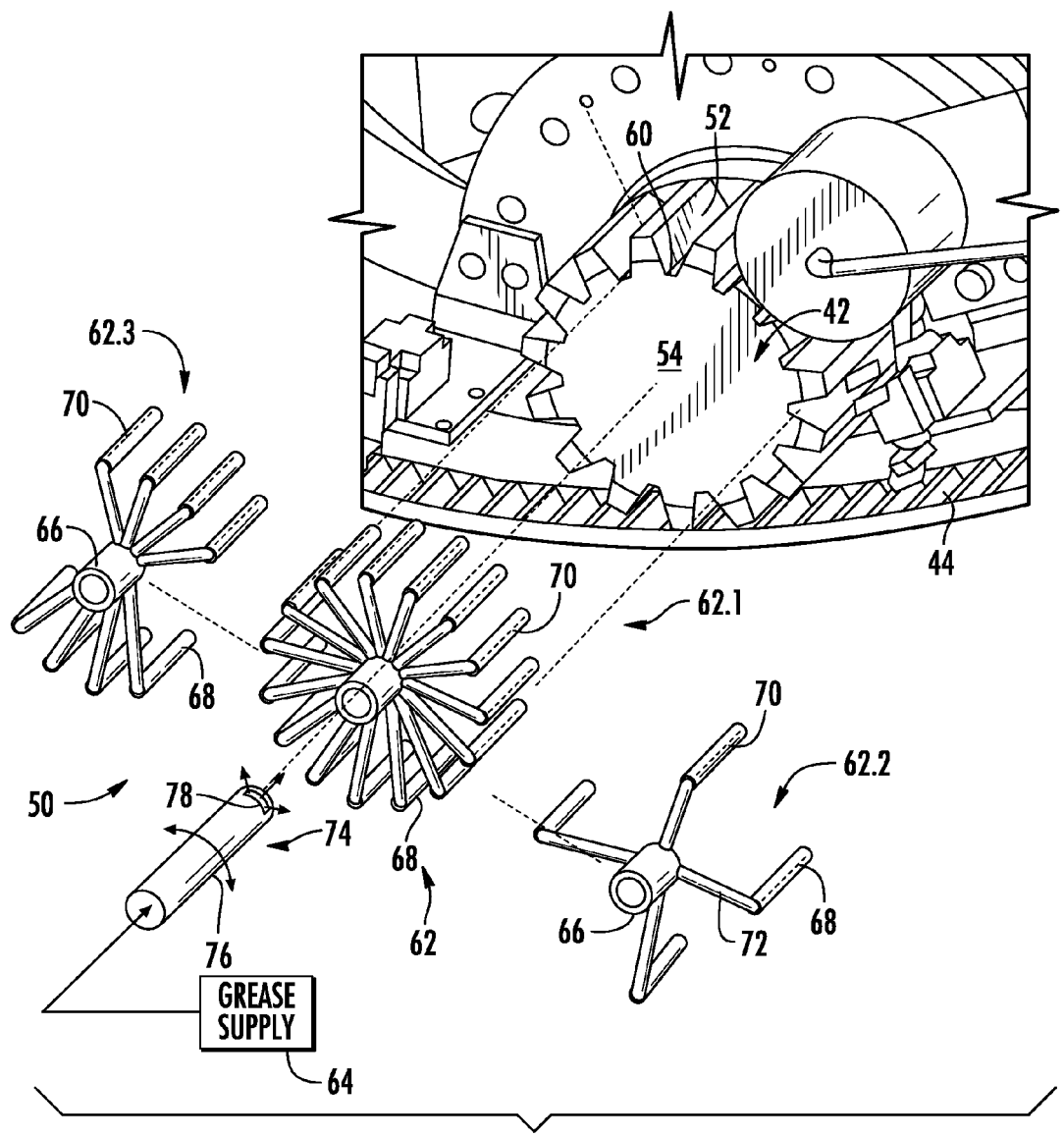
FIG. 3 illustrates an inline component view of a pitch drive mechanism in accordance with an embodiment of the invention.

Referring to FIG. 3, various different embodiments of a grease distributor 62 are depicted. It should be readily appreciated that the distributor 62 is not limited to any particular configuration, and that any shape and configuration of components that are suitable for mounting externally to the pinion gear 42 in accordance with aspects of the invention are within the scope and spirit of the present invention. As depicted in FIG. 3, the pinion gear 42 includes a plurality of gear teeth 52 that mesh with gear teeth 58 (FIG. 8) on the bearing gear 44, as is appreciated by those skilled in the art. Gear teeth valleys 60 are defined between adjacent gear teeth 52. In the various embodiments illustrated in FIG. 3, the distributor (62.1, 62.2, and 62.3) includes a central hub 66 that is configured for receipt of grease from an external grease supply 64. The external grease supply 64 may be any conventional mechanism or system commonly used for delivering grease to bearings and the like. It should be appreciated that the invention is not limited to any particular configuration of external grease supply 64. The central hub 66 may be configured as a generally cylindrical member, as depicted in the figures.

Still referring to FIG. 3, the grease distributor 62 includes at least one channel member 68 that is in fluid communication with the hub 66, for example via a spoke arm 72 that projects radially from the hub 66. The channel members 68 have a length and configuration so as to slide into the gear teeth valleys 60 between adjacent gear teeth 52 of the pinion gear 42, as particularly illustrated in FIGS. 4 through 7. The channel members 68 may be, for example, cylindrical members having a height (diameter) and length profile so as to fit within the gear teeth valleys 60 without contacting the inter-engaging teeth 58 of the bearing ring 44, as is particularly illustrated in FIG. 8.

Still referring to FIG. 3, the channel members 68 include one or more exit orifices 70 defined therein. With this configuration, grease supplied to the central hub 66 is forced into the channel member 68 via the spoke arms 72. The grease 82 (FIGS. 4 and 8) is forced out of the exit orifices 70 in the channel member 68 and into the gear teeth valleys 60, and is thus transferred to the gear teeth 58 of the bearing ring 44.

Referring again to FIG. 3, the embodiment 62.1 of the grease distributor includes a plurality of the channel members 68 configured with the hub 66. In this particular embodiment, a respective channel member 68 is provided for each of the gear teeth valleys 60 in the pinion gear 42. Thus, it should be appreciated that the distributor 62.1 is aligned on the front face 54 of the pinion gear 42 such that each of the channel members 68 extends into a respective gear tooth valley 60. In this embodiment, each of the channel members 68 may include exit orifices 70, as discussed above.

The embodiment 62.2 of a grease distributor in FIG. 3 includes four channel members 68 disposed at cardinal headings. Any one or all of the channel members 68 may include exit orifices 70. Likewise, the embodiment 62.3 of a grease distributor depicted in FIG. 3 includes defined sectors of channel members 68. It should be appreciated that with the embodiments 62.2 and 62.3 of a grease distributor, that not all of the gear teeth valleys 60 in the pinion gear 42 are assigned a channel member. These embodiments, however, may be useful for delivery of grease to only specified circumferential sectors of the pinion gear 42, particularly where history and maintenance indicates that certain sectors of the pinion gear experience greater wear and erosion than others, particularly in the 0° positional sector. The distributor 62.2 and 62.3 may be variably positional relative to the pinion gear 42 so that the distributors can be repositioned for distribution of grease into the other gear teeth valleys 60 during scheduled maintenance times. The distributors 62.2, 62.3 may be simply disengaged from the pinion gear 42 and rotated into any desired position on the pinion gear 42 for this purpose.

Figure 6:
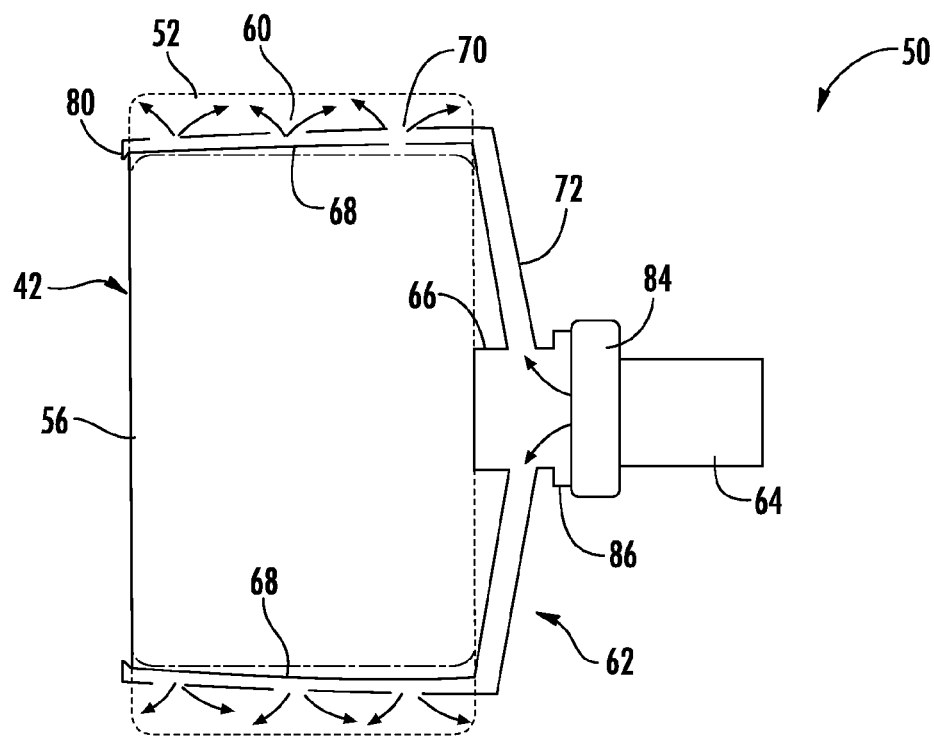
FIG. 6 illustrates a side view of an alternative embodiment of a grease distributor.
Figure 7:
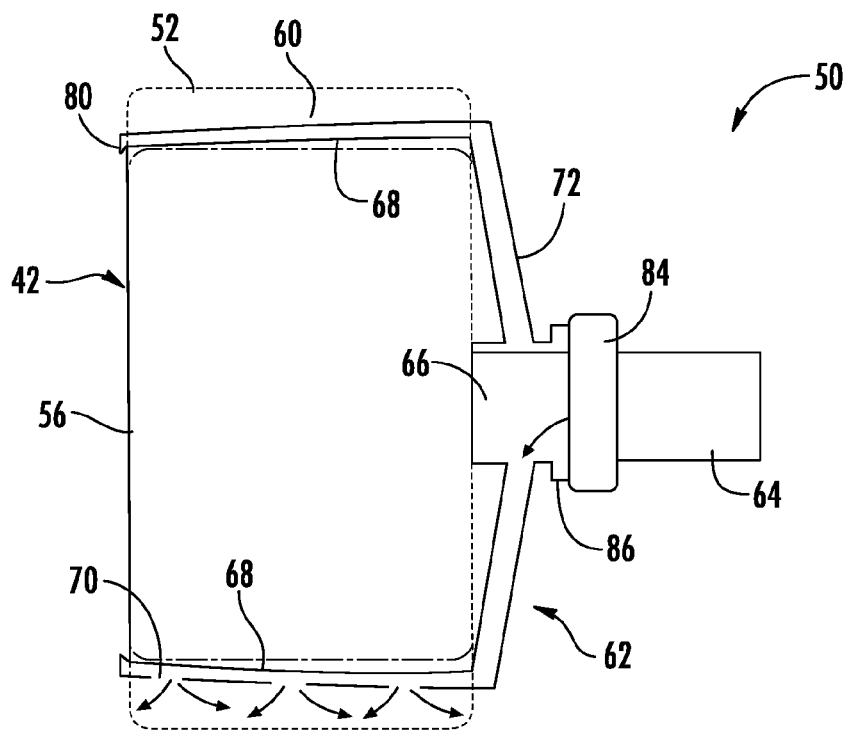
FIG. 7 illustrates a side view of another embodiment of a grease distributor.

In a particular embodiment, the distributor 62 may be configured for direct receipt of grease from an external grease supply 64, for example as depicted in FIGS. 6 and 7. In this arrangement, the grease is injected under pressure from the external grease supply 64 directly into the hub 66, wherein the grease migrates through the spokes 72 and into the respective channel member 68. The grease is forced out of the orifices 70 as indicated by the arrows in FIG. 6 from any of the channel members 68 that are in fluid communication with the hub 66. This particular embodiment may be desired wherein the distributor 62 only has a defined number of channel members 68 for application of grease to a relatively defined sector of the pinion gear 42, as in the embodiment of the distributor 62.3 or 62.2 depicted in FIG. 3. For example, the distributor 62 may be disposed on the pinion gear 42 so that the limited number of channel members 68 supply grease to the contact areas of the respective gears along the 0° positional range.

FIG. 7 depicts an embodiment that is similar to FIG. 6 with the exception that the upper channel member 68 is not in fluid communication with the hub 66, and serves as a retaining arm or mechanism for securing the distributor 62 onto the pinion gear 42. Thus, it should be appreciated, that all of the channel members 68 need not be configured for actual distribution of grease, but may be utilized for other purposes, including retention of the distributor 62 on the pinion gear 42.

In FIGS. 6 and 7, the external grease supply 64 is mated to the central hub 66 by any convenient quick-release mechanism. The figures illustrate a collar 84 on the external grease supply 64 that mates with a flange 86 on the hub 66 by any convenient means, including a ball/detent mechanism, threaded connection, clamp, and so forth.

Figure 4:
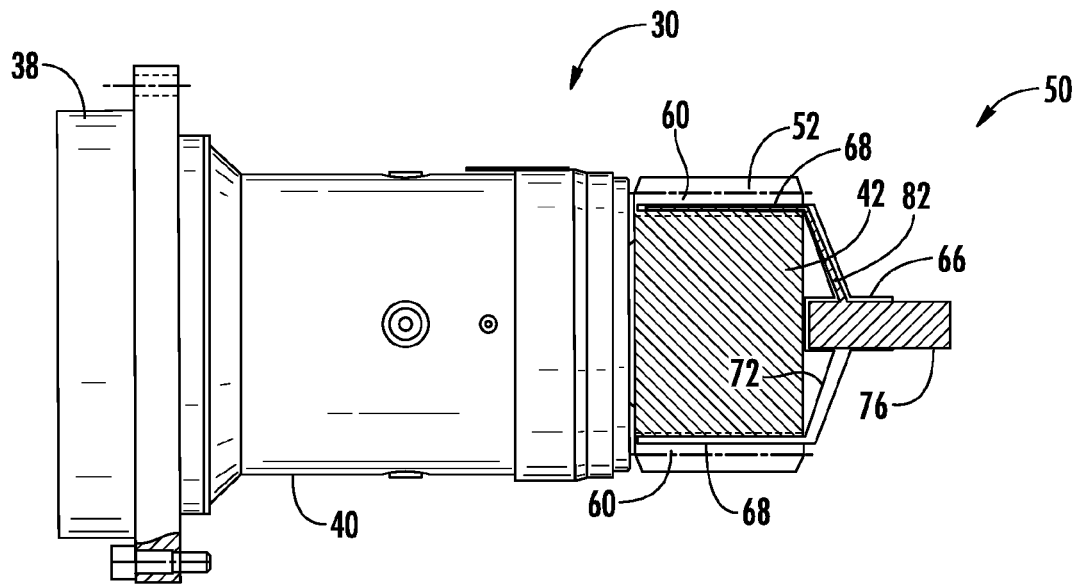
FIG. 4 illustrates a side perspective view of a pitch drive motor and pinion gear with attached grease distributor.
Figure 5:
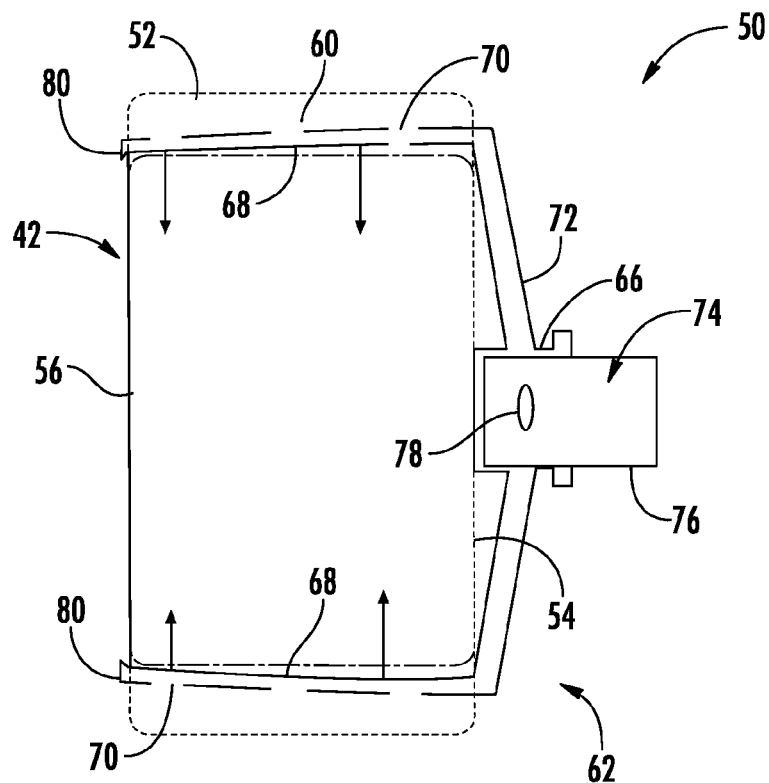
FIG. 5 illustrates a side view of an embodiment of a grease distributor.

Referring to FIGS. 3 through 5, it may in certain embodiments be desired to incorporate a restrictor 74 with the grease distributor 62. The restrictor 74 serves to limit the number of channel members 68 that receive grease from the hub 66. In the illustrated embodiment, the restrictor 74 is configured as a cylindrical member 76 having a directional opening 78 defined therein. The cylinder 76 slides within the central hub 66 and is configured to receive the pressurized grease from the external grease supply 64. The grease exits the cylinder 76 via the directional opening 78. With this configuration, only the channel members 68 that are in fluid communication with the directional opening 68 via respective spoke arms 72 will receive the majority of the grease from the restrictor 74. It should be appreciated that some of the grease will migrate around the restrictor cylinder 76 and into the other channel members 68, but this amount of grease will be relatively insignificant as compared to the grease that is directed into the channel members 68 that are aligned with the directional opening 78.

With the restrictor 74, the number or pattern of channel members 68 that receive grease from the restrictor 74 is easily changed by simply rotating the cylinder 76 within the central hub 66. In other words, the central hub 66 need not be disengaged from the pinion gear 42 to redistribute the grease. The rotational position of the cylinder 76 is easily changed so that he directional opening 78 is aligned with other channel members 68, as depicted in FIGS. 4 and 5. Any manner of releasable locking mechanism may be configured between the cylinder 76 and the hub 66 for this purpose.

The distributor 62 may be releasably engaged on the pinion gear 42 by various means, which may be permanent or releasable. In the embodiment depicted in the figures (particularly FIGS. 5 through 7), the channel members 68 are spring-biased radially inward towards the hub 66, as depicted by the arrows in FIG. 5, and thus clamp onto the pinion gear in the respective gear teeth valleys 60. A retaining lip 80 may be configured on the axial ends of the channel members 68 that engages against the rear face 56 of the pinion gear to prevent inadvertent axial displacement of the distributor 62 relative to the gear 42.

Figure 8:
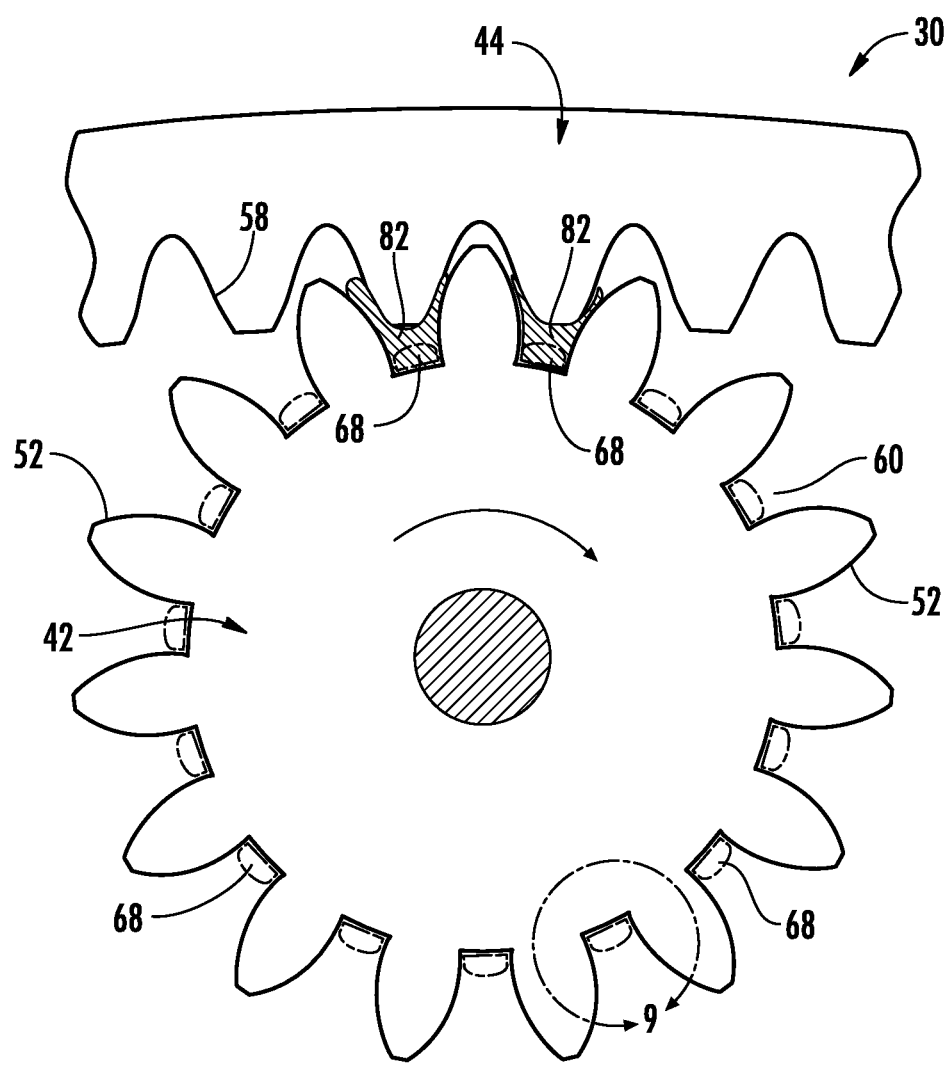
FIG. 8 illustrates a pinion gear with attached grease distributor engaged with a bearing gear.

FIG. 8 depicts an operational view of the grease distribution system between a pinion gear 42 engaged with a bearing gear 44. It can be appreciated from FIG. 8 that, although a channel member 68 is disposed within each respective gear tooth valley 60, only the channel member 68 in the contact area of the pinion gear 42 with the bearing gear 44 are supplied with grease 82. This grease 82 migrates into the gear tooth valley 60 and onto the gear teeth 58 of the bearing ring 44. Thus, the grease 82 is delivered directly to the contact areas between the respective gears and is not "wasted" on other gear teeth that do not necessarily need the grease. The selective use of the channel member 68 may be accomplished via any of the means described herein, including the variably positionable restrictor 74, isolation of certain ones of the channel members 68 (as in FIG. 7), or only providing channel members 68 in defined sectors, as in the embodiments 62.2 and 62.3 of FIG. 3.

Figure 9:
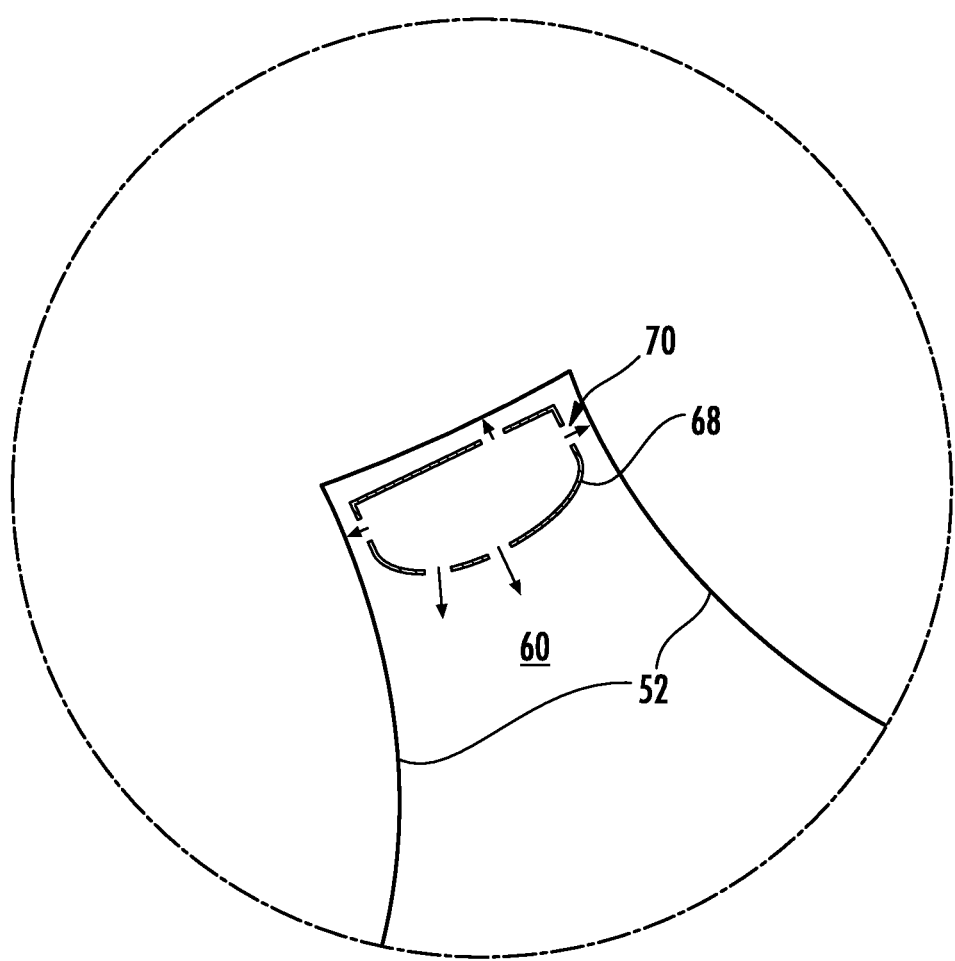

FIG. 9 depicts one of the channel members 68 of FIG. 8 in greater detail. It can be appreciated from this view that any number, pattern, and orientation of exit orifices 70 may be provided at discrete locations or uniformly along the length of the channel member 68 for supplying grease into the tooth valley 60, including between the bottom/sides of the channel member and gear teeth 52.

The present invention also encompasses various method embodiments for lubricating gears in a wind turbine blade pitch drive 30, wherein the pitch drive 30 comprises a drive pinion gear 42 with gear teeth 52 that engage a pitch bearing gear 44. The method embodiments include injecting grease into valleys 60 defined between adjacent teeth 52 of the pinion gear 42 with a device that resides in the respective valleys 60 during normal power-production operation of the wind turbine 10. This device may be, for example, a grease distributor 62, as discussed above, but the method embodiments are not limited to a grease distributor 62.

The method embodiments may include injecting the grease into only select valleys 60 of the pinion gear 42, or all of the valleys 60, as discussed above. In a particular embodiment, the select valleys are at the 0° positional contact range of the pinion gear 42 with the bearing gear 44. The method may include selectively moving the grease distributing device around the pinion gear 42 to lubricate different ones of the valleys 60. In an alternative embodiment, the method may include injecting grease into all of the valleys 60 of the pinion gear 42 with the distribution device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for lubricating gears in a wind turbine blade pitch drive, wherein said pitch drive comprises a drive pinion gear with gear teeth that engage a pitch bearing gear coupled to a respective wind turbine blade, said system comprising:
    a grease distributor configured to mount onto and rotate coaxial with said pinion gear; and
    said distributor comprising at least one channel member having a length and height profile so as to extend longitudinally along a gear tooth valley defined between adjacent teeth of said pinion gear without contacting inter-engaging teeth of said bearing gear and configured to deliver grease from an external grease supply to the gear tooth valley defined between adjacent teeth of said pinion gear in a contact area of said pinion gear with said bearing gear without said channel member contacting inter-engaging teeth of said bearing gear.

2. The gear lubricating system of claim 1, wherein said distributor comprises a hub configured for receipt of grease from the external grease supply, the channel member in fluid communication with said hub, said channel member having an exit orifice defined therein such that grease supplied under pressure to said hub is distributed via said channel member to the gear tooth valley while said pinion gear remains engaged with said bearing gear.

3. The gear lubricating system of claim 2, wherein said grease distributor is variably positionable on said pinion gear such that said channel member is positionable in different tooth valleys of said pinion gear.

4. The gear lubricating system of claim 3, wherein said hub is configured for direct receipt of grease from an external grease supply such that grease is forced directly from said hub into said channel member.

5. The gear lubricating system of claim 2, comprising a plurality of said channel members circumferentially spaced around said hub, each of said channel members in fluid communication with said hub.

6. The gear lubricating system of claim 5, wherein a respective said channel member is disposed within each tooth valley of said pinion gear.

7. The gear lubricating system of claim 5, further comprising a restrictor disposed within said hub, said restrictor configured to allow passage of grease to said channel members within a defined circumferential sector, and to block passage of grease to said channel members not within said defined circumferential sector.

8. The gear lubricating system of claim 7, wherein said restrictor is variably positionable relative to said hub so as to change said defined circumferential sector without repositioning said grease distributor on said pinion gear.

9. A system for lubricating gears in a wind turbine blade pitch drive, wherein said pitch drive comprises a drive pinion gear with gear teeth that engage a pitch bearing gear coupled to a respective wind turbine blade, said system comprising:

a grease distributor configured to mount onto and rotate with said pinion gear;

said distribution configured to deliver grease from an external grease supply to at least one valley defined between adjacent teeth of said pinion gear in a contact area of said pinion gear with said bearing gear without contacting inter-engaging teeth of said bearing gear;

wherein said distributor comprises a hub configured for receipt of grease from the external grease supply, and a plurality of channel members circumferentially spaced around said hub and in fluid communication with said hub, said channel members having a length and height profile so as to extend longitudinally along the gear tooth valley without contacting inter-engaging teeth of said bearing gear, said channel members having an exit orifice defined therein such that grease supplied under pressure to said hub is distributed via said channel members to the gear tooth valley while said pinion gear remains engaged with said bearing gear; and wherein said channel members are releasably engaged to said pinion gear for retaining said distributor on said pinion gear.

10. The gear lubricating system of claim 9, wherein said channel members are radially biased against said pinion gear.

11. The gear lubricating system of claim 10, wherein said channel members comprise a retaining lip defined on a longitudinal end thereof, said retaining lips engaging against an end face of said pinion gear.

12. A method for lubricating gears in a wind turbine blade pitch drive, wherein the pitch drive comprises a drive pinion gear with gear teeth that engage a pitch bearing gear coupled to a respective wind turbine blade, the method comprising:

injecting grease into valleys defined between adjacent teeth of the pinion gear with a device mounted onto and coaxial with the pinion gear and having a member that resides in the respective valleys during normal power-production operation of the wind turbine without the member contacting gear teeth of the pitch drive.

13. The method for lubricating of claim 12, comprising injecting the grease into only select valleys of the pinion gear.

14. The method for lubricating of claim 13, wherein the select valleys are at the position of the pinion gear engaged with the bearing gear when the wind turbine blades are at the 0° position.

15. The method for lubricating of claim 13, wherein the device is selectively moved around the pinion gear to lubricate different ones of the valleys.

16. The method for lubricating of claim 12, comprising injecting the grease into all of the valleys of the pinion gear with the device.

* * * * *